United States Patent
Juwvipart et al.

(10) Patent No.: US 11,659,358 B2
(45) Date of Patent: *May 23, 2023

(54) REAL TIME ANNOTATION AND GEOLOCATION TRACKING OF MULTIPLE DEVICES USING AUGMENTED REALITY FOR 5G OR OTHER NEXT GENERATION WIRELESS NETWORK

(71) Applicant: AT&T Intellectual Property I, L.P., Atlanta, GA (US)

(72) Inventors: Bennett Juwvipart, Encinitas, CA (US); Benjamin Ma, San Jose, CA (US); Matthew Kilcher, Redondo Beach, CA (US); Shannen Lam, Irvine, CA (US); Damilola Folorunsho, Lafayette, LA (US)

(73) Assignee: AT&T INTELLECTUAL PROPERTY I, L.L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,731

(22) Filed: May 10, 2022

(65) Prior Publication Data

US 2022/0272493 A1 Aug. 25, 2022

Related U.S. Application Data

(63) Continuation of application No. 16/714,146, filed on Dec. 13, 2019, now Pat. No. 11,356,806.

(51) Int. Cl.
*H04W 24/00* (2009.01)
*H04W 4/029* (2018.01)

(52) U.S. Cl.
CPC ................ *H04W 4/029* (2018.02)

(58) Field of Classification Search
CPC ....... H04W 4/02; H04W 4/021; H04W 4/024; H04W 4/025; H04W 4/026; H04W 4/027; H04W 4/029
See application file for complete search history.

(56) References Cited

U.S. PATENT DOCUMENTS 9,710,969 B2 7/2017 Malamud et al.
2003/0198192 A1 10/2003 Tani
(Continued)

OTHER PUBLICATIONS

Non-Final Office Action received for U.S. Appl. No. 16/714,146 dated Dec. 15, 2020, 28 pages.
(Continued)

*Primary Examiner* — Matthew W Genack
(74) *Attorney, Agent, or Firm* — Amin, Turocy & Watson, LLP

(57) ABSTRACT

A system that can provide a real time annotation and tracking of multiple devices operating in a network using augmented reality is initiated by activating an augmented reality display system, transmitting location information to a network controller, joining a network of network devices established by the network controller, wherein the network devices of the network communicate with one another using a communication network, scanning a geographical area using a display, wherein the display comprises a display area, and in response to determining that a first device of the network devices is within the display area, displaying, via the display, a first image identifying the first device, first device location information and first distance information associated with a first distance to the first device.

20 Claims, 12 Drawing Sheets

(56) References Cited

U.S. PATENT DOCUMENTS

| | | |
|---|---|---|
| 2006/0105776 A1 | 5/2006 | Burke |
| 2012/0088526 A1 | 4/2012 | Lindner |
| 2012/0131458 A1 | 5/2012 | Hayes |
| 2019/0021125 A1 | 1/2019 | Bischinger |
| 2019/0206134 A1 | 7/2019 | Devam et al. |

OTHER PUBLICATIONS

Final Office Action received for U.S. Appl. No. 16/714,146 dated May 18, 2021, 30 pages.
Non-Final Office Action received for U.S. Appl. No. 16/714,146 dated Jul. 30, 2021, 32 pages.
Final Office Action received for U.S. Appl. No. 16/714,146 dated Jan. 5, 2022, 35 pages.

REAL TIME ANNOTATION AND GEOLOCATION TRACKING OF MULTIPLE DEVICES USING AUGMENTED REALITY FOR 5G OR OTHER NEXT GENERATION WIRELESS NETWORK

RELATED APPLICATION

The subject patent application is a continuation of, and claims priority to, U.S. patent application Ser. No. 16/714,146, filed Dec. 13, 2019, and entitled "REAL TIME ANNOTATION AND GEOLOCATION TRACKING OF MULTIPLE DEVICES USING AUGMENTED REALITY FOR 5G OR OTHER NEXT GENERATION WIRELESS NETWORK," the entirety of which application is hereby incorporated by reference herein.

TECHNICAL FIELD

This disclosure relates generally to tracking multiple devices within a network of devices in a wireless network. More specifically, facilitating a real time annotation and tracking of multiple devices operating in a network using augmented reality, e.g., for 5th generation (5G) or other next generation wireless network.

BACKGROUND 5G wireless systems represent a next major phase of mobile telecommunications standards beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. 5G research and development also aims to be interoperable with technologies used for the first responder network authority (FirstNet). The FirstNet is a nationwide high-speed broadband wireless network platform for law enforcement, firefighters, paramedics and other public safety officials in every state, county, locality and tribal area. The FirstNet uses a public safety's spectrum (e.g., Band 14) for its operations. Public safety personal using FirstNet devices will have specified quality of service (QoS) channel indicator (QCI) and dedicated access to this network in times of crisis, they will be preferred over commercial users. During times of crises, the users of FirstNet also obtain information that is automatically provided them, regarding other users of the FirstNet, without having to initiating multiple requests.

The above-described background relating to relating FirstNet in the 5G communication system and requirements of the user of FirstNet, is merely intended to provide a contextual overview of some current issues, and is not intended to be exhaustive (e.g., although problems and solution are directed to next generation networks such as 5G, the solutions can be applied to 4G/LTE technologies). Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
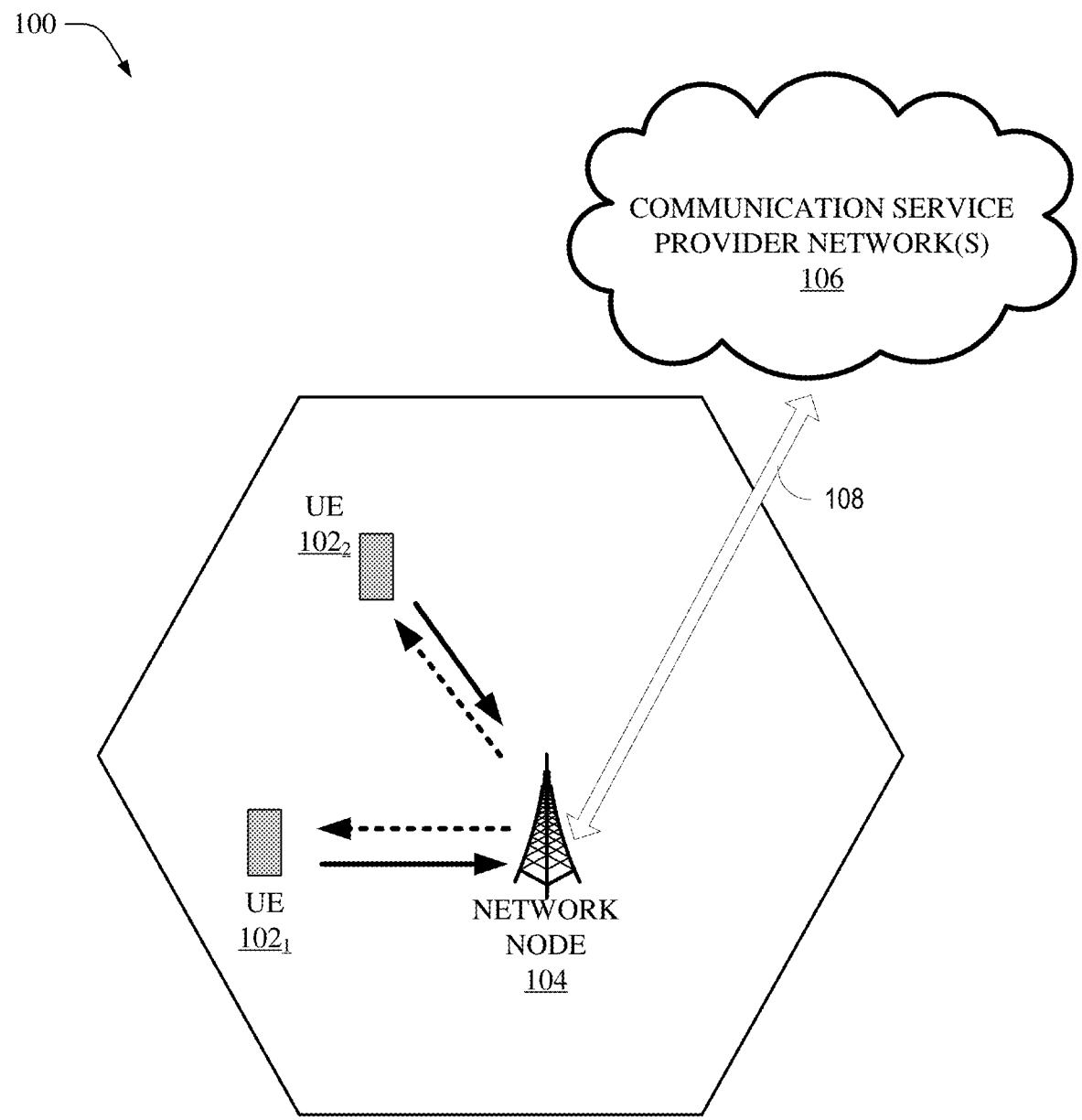
FIG. 1 illustrates an example wireless communication system in which a network node device and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate real time annotation and tracking of multiple devices operating in a network using augmented reality. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or other LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate real time annotation and tracking of multiple devices operating in a network using augmented reality. Facilitating real time annotation and tracking of multiple devices operating in a network using augmented reality can be implemented in connection with any type of device with a connection to the communications network (e.g., a mobile handset, a computer, a handheld device, etc.) any Internet of Things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments, the non-limiting term radio, network node device, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, evolved Node B (eNB or eNodeB), next generation Node B (gNB or gNodeB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller (e.g., controller, central controller, or centralized unit) that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

Communication between professional teams (e.g., firefighters, police, etc.) operating in extreme environments is important. For example, communication is critical between teams of firefighters that are fighting fires in wild or fighting fire inside a building that is full of smoke. For operation efficiency, information about each member of the team and their surrounding is critical. In addition to audio communication, receiving non-audio information (e.g., location or vital information is generally not communicated via audio during firefighting) can increase coordination during firefighting in extreme environment. Providing visual information, especially where audio communication is not enough, to convey information (e.g., vital stats of a firefighter or location) to other team members, can be extremely useful to coordinate handling any extreme situations. It is important to have as much data as possible relayed from each member of a team, especially where location awareness of team is a critical component. In some embodiments, described herein, is a wearable augmented reality (AR) device (e.g., an attachable or embedded processor connected to a headset with a visual display) that overlays annotated geo-location landmarks and real-time location information of connected AR devices onto the user's device. This solution improves upon current location communication by using visual display for a pre-defined set of users (e.g., displaying location, vital stats, direction, etc. of the user). The solution does not rely on audio, which may be muffled or unclear in a noisy environment such as in a disaster response or crowded area like a music concert. Using 5G and available location determining technologies, locations can be broadcasted by the AR device in real-time. Using the AR interface, users do not have to look down at a smartphone or other device to view location information of members of their team—it is immediately accessible on display of user's device.

According to an embodiment, a system can comprise a processor and a memory that stores executable instructions that, when executed by the processor, facilitate performance of operations activating an augmented reality display system. The system can further facilitate transmitting location information to a network controller, joining a network of network devices established by the network controller, wherein the network devices of the network communicate with one another using a communication network, scanning a geographical area using a display, wherein the display comprises a display area, and in response to determining that a first device of the network devices is within the display area, displaying, via the display, a first image identifying the first device, first device location information and first distance information associated with a first distance to the first device.

According to another embodiment, described herein is a method that can comprise activating, by a system comprising a processor, an augmented reality display system, transmitting, by the system, location data to a network controller, connecting to a network of network devices, wherein the network is established by the network controller and comprises the network devices communicating with the network controller using a communication network, scanning a geographical area using a display, wherein the display comprises a display area, determining whether a device of the network is within the display area; and in response to a result of the determining indicating that the device is within the display area, displaying via a portion of the display, an image identifying the device, device location data and distance data associated with a distance to the device.

According to yet another embodiment, a device can comprise a processor and a memory that stores executable instructions that, when executed by the processor, facilitate performance of operations comprising activating an augmented reality display system, in response to the activating the augmented reality display system, determining a device location using location data received via a communication link established by a network controller, transmitting a request to the network controller to join a network established by the network controller, wherein the network comprises network devices communicating with each other using a communication network, scanning a geographical area using a display, wherein the display comprises a display area, determining that a first device of the network devices is within the display area, and in response to the determining that the first device is within the display area, displaying, via the display, a first image identifying the first device, first device location information and first distance information associated with a first distance to the first device.

These and other embodiments or implementations are described in more detail below with reference to the drawings. Repetitive description of like elements employed in the figures and other embodiments described herein is omitted for sake of brevity.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment (UE) can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosure, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or include a large-scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
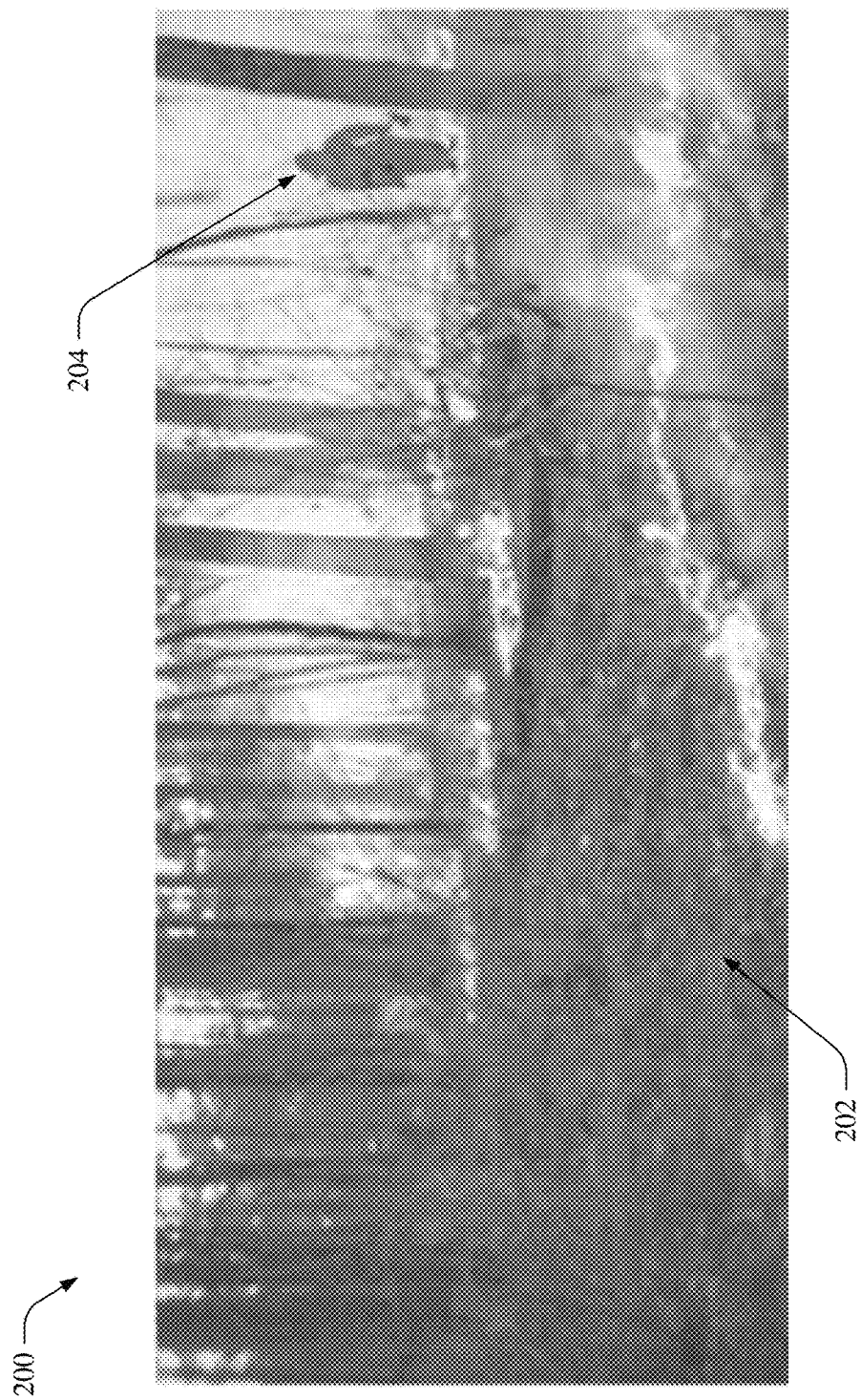
FIG. 2, illustrated is an example of image seen by user/person without use of a mask according to one or more embodiments.

Referring now to FIG. 2, illustrated is an example of image 200 seen by user/person without use of a mask according to one or more embodiments. The image further illustrates an image of the area 202 near the user. The image of one or more members of user's team is illustrated by first image 204.

Figure 3:
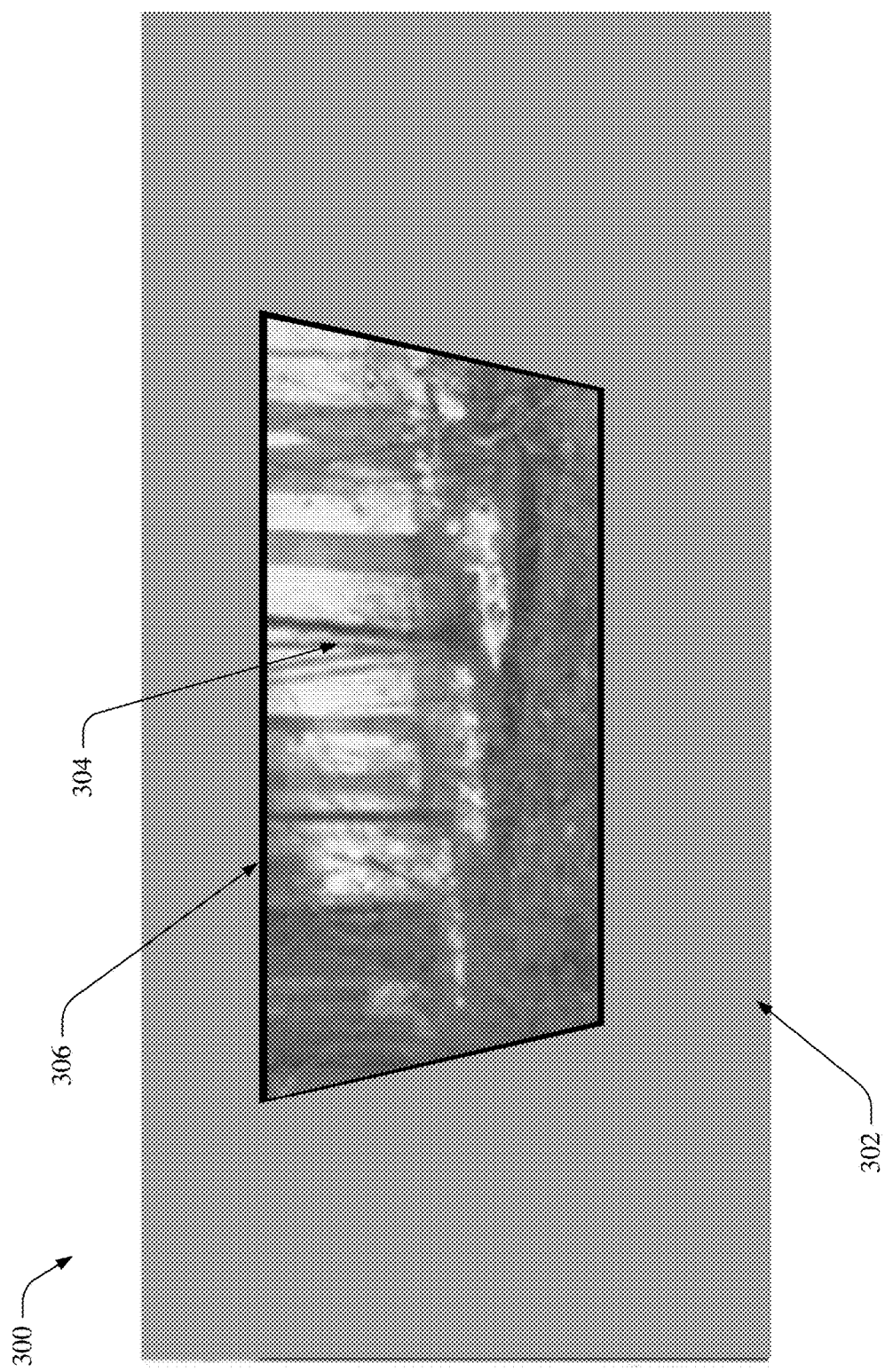
FIG. 3, illustrated is an example of image seen by user/person with use of a mask according to one or more embodiments.

Referring now to FIG. 3, illustrated is an example of image 300 seen by user/person with use of a mask according to one or more embodiments. The grey area 302 illustrates a blocked area, wherein upon user placing a mask or goggles over the face blocks out a portion of the image 202. The remaining image 304 is the portion of the image 200 that is visible once the user places a mask over their face. The remaining image 304 defines a display area 306. In some embodiments, when a user places the mask over their face, the user is only able to view a portion of the image, e.g., remaining image 304. It should be noted that the display area 306 can vary based on size and shape the mask's viewing area. Also, the system described herein may be implemented by a mobile device (e.g., mobile phones, tablets, laptops, etc.) having a display area. All these devices comprise a display with limited viewing area. The user can view different part of the image 200 by moving the mobile device, and thus the display area 306, to capture a new image. In some embodiments, the direction (e.g., direction vector) where the user is looking or pointing a mobile device determines what is displayed within the display area 306. In some embodiments, the direction vector comprises a 360-degree value from the user perspective. In another embodiment, the direction vector can be longitude and latitude values.

Figure 4:
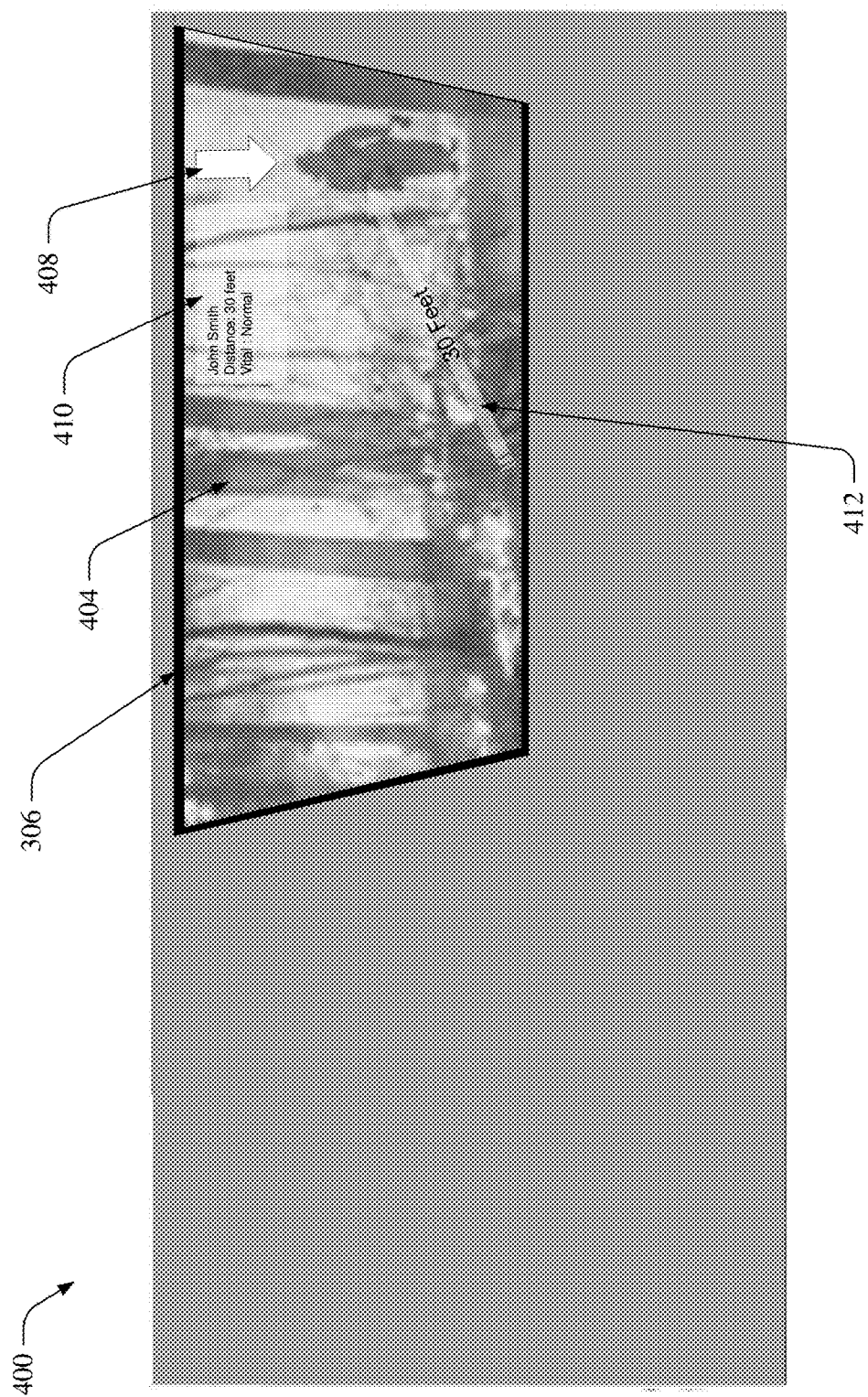
FIG. 4, illustrated is an example of information being displayed according to an embodiment described herein.

Referring now to FIG. 4, illustrated is an example of information being displayed according to an embodiment described herein. In some embodiments, when the user changes the display area 306 by looking in a different direction or pointing the mobile device in different direction, the image within the display area 306 changes. For example, the user looking in a different direction (e.g., trying to find members of his team and to the right), a different image 404 is visible in the display area 306.

In some embodiments, if a member of the user's team is within the display area 306, predefined information is displayed within the display area. As discussed in detail below, a member of the team is defined by a device, used by the user (e.g., carried by the user, or attached to an equipment or embedded in another device), that is connected to a network or utilizes the same network as the user's device. If the member is within the display area, information about the member is displayed using an augmented reality system to display additional information within the display area. For example, when the member is determined to be within the display area, an image of an arrow 408 is placed to indicate the location of the member within the display area 306. Further, a display box 410 that comprise location information, identification, vital statistics, distant from the user, or the like is displayed using augmented reality, wherein images are displayed, for example, but not limited to, viewing area of the mask. In some embodiments, an arrow or other image is casted from the bottom center of the display area to the member's location in the display area and indicating how far the team member is from the user.

In some embodiments, the device may be placed on non-mobile item (e.g., a building) and connected to the network. For example, the device may be attached to a building to identify a landmark or specific item. Information about the landmark or the item may be stored in the device's memory and transmitted to the core network. When the device is determined to be within the display area, an image of an arrow 408 is placed to indicate the location of the device and information about the item attached to the device may be displayed within the display area 306. The display box 410 may be utilized to display information about the item attached to the device.

Figure 5:
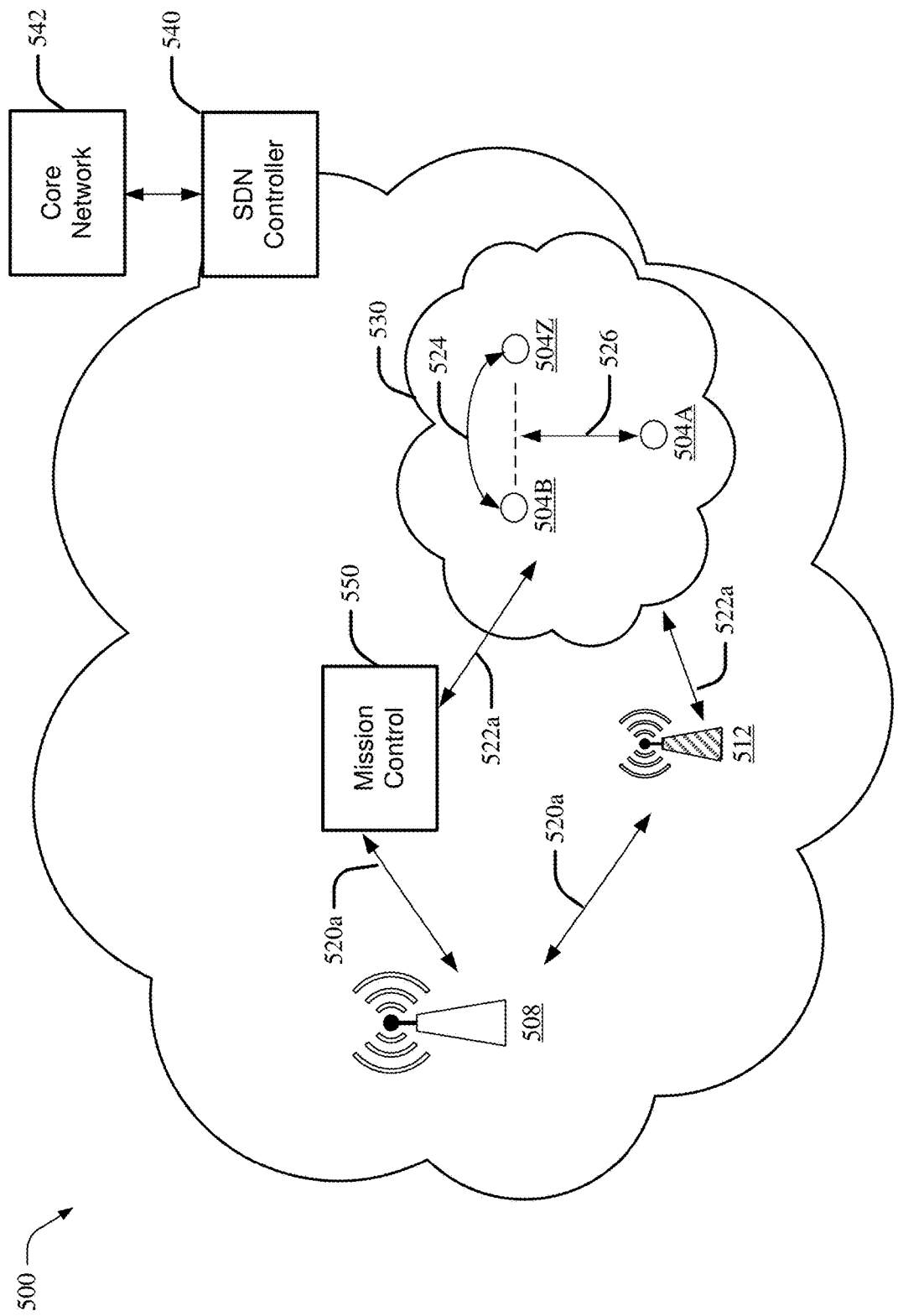
FIG. 5 illustrates an example 5G LTE-NR network architecture used for facilitating real time annotation and tracking of multiple devices using augmented reality in accordance with various aspects and embodiments described herein.

FIG. 5 illustrates an example 5G LTE-NR network architecture 500 used for facilitating real time annotation and tracking of multiple devices operating in a network using augmented reality in accordance with various aspects and embodiments described herein. In some embodiments, a new device 504A joins existing sub network 530 (e.g., a network set up by core network 542 via the SDN controller and a base station 508). The sub network 530 may comprise devices 504B through 540Z. Upon the new device 504A joining the sub network 530, a communication link 526 is established which provides access to secondary base station 512 via communication link 522*a*.

In some other embodiments, the SDN controller 540 utilizes the base station 508 and a secondary base station 512 to establish and maintain sub network 530. The SDN controller 540 can add and subtract devices. The SDN controller 540 can further track various information about the device and the user of the device. For example, the SDN controller 540 can track and store in memory display information for a device. For example, the display information can comprise, but not limited to, location of the device (e.g., longitude and latitude), vital signs of the user using the device, environment information surrounding the device (e.g., temperature, signal strength, number of devices within a pre-defined area (e.g., 3 feet), air quality, etc.), any landmarks near the device, and the like. The display information is transmitted to one or more devices that is used to display using augmented reality when a pre-defined event occurs. For example, when the member device is within a display range of a first device, an event is triggered so that display information about the member device is downloaded to the first device.

In some other embodiments, the mission control 550 utilizes the base station 508 and a secondary base station 512 to establish and maintain sub network 530. The mission control 550 can add and subtract devices. The mission control 550 can further track various information about the device and the user of the device. For example, the mission control 550 can track and store in memory display information for a device. For example, the display information can comprise, but not limited to, location of the device (e.g., longitude and latitude), vital signs of the user using the device, environment information surrounding the device (e.g., temperature, signal strength, number of devices within a pre-defined area (e.g., 3 feet), air quality, etc.), any landmarks near the device, and the like. The display information is transmitted to one or more devices that is used to display using augmented reality when a pre-defined event occurs. For example, when the member device is within a display range of a first device, an event is triggered so that display information about the member device is downloaded to the first device.

Figure 6:
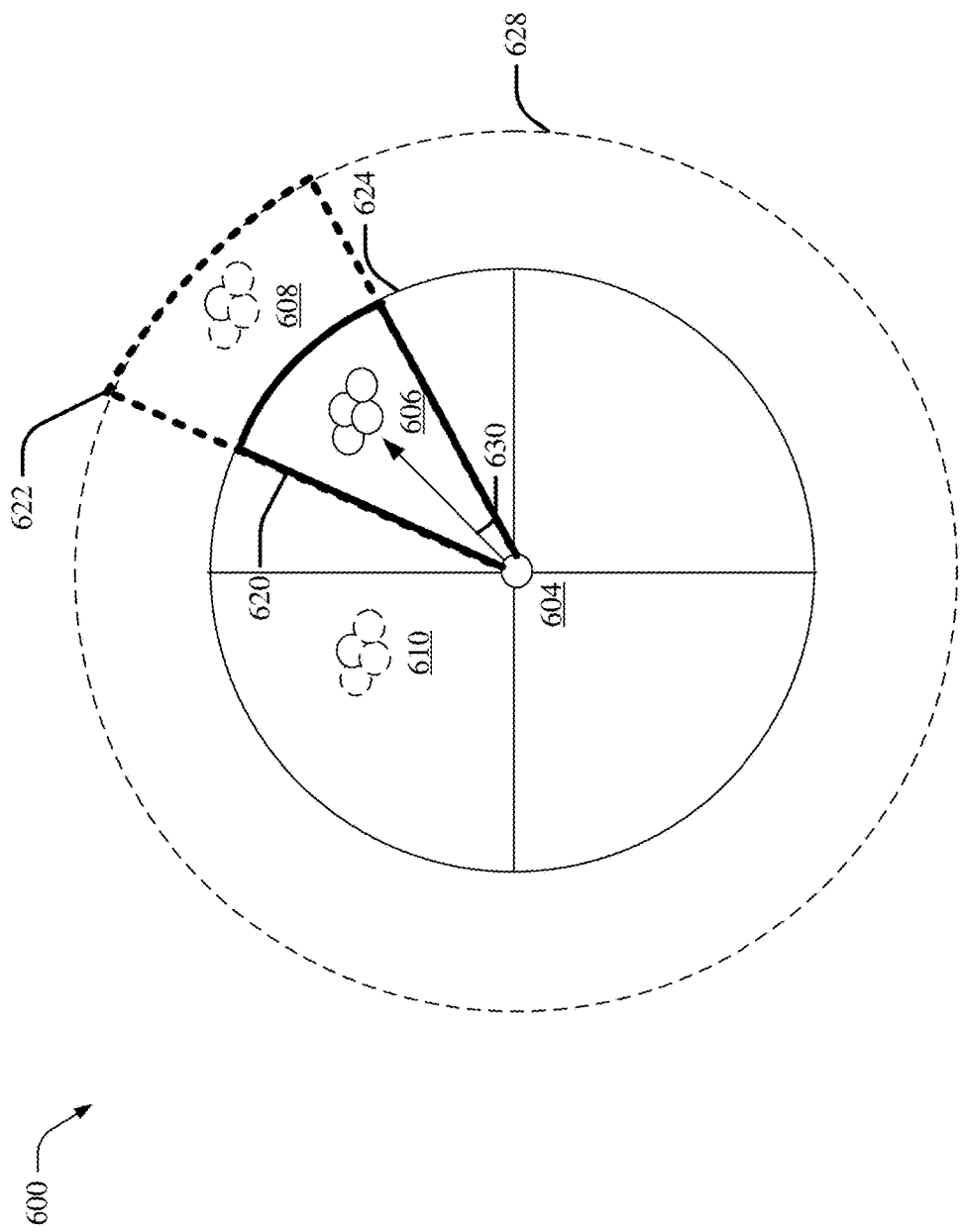
FIG. 6 illustrates top view and exemplary display range area associated with the device in accordance with various aspects and embodiments described herein.

FIG. 6 illustrates top view and exemplary display range area associated with the device in accordance with various aspects and embodiments described herein. In some embodiments, the device 604 can be initialized with initial range area 624 based geographical area surround the device 604, wherein members within the initial range area (e.g., a circular area with radius of 50 feet from the device 604) are within range. In an embodiment, the initial range can be modified to a modified range area 628. The modified range area 628 can be adjustable such that the modified range area can be smaller than initial range area 624 (not shown). Based on the direction 630 (e.g., direction vector) the user is looking at or has pointed the device an initial display range area 620 is defined. Any device that is part of network (e.g., sub network 530 of FIG. 5) is within the initial display range area 620, is considered to within display area 306 that will trigger an event for either SND controller 540 or the mission control 550 to download display information to the device 604. The initial display range area 620 can also be modified to define a modified display range area 622 (e.g., larger than the display range area 620). The modified display range area 622 can be adjustable such that the modified display range area 622 can be smaller than the initial display range area 620 (not shown).

As illustrated, a group of member devices 606 (e.g., one or more device that part of the same sub network as device 604) are within the initial range area 624 and modified range area 628. The group of member devices 606 are also within the display area that triggers an event to cause the system to download display information to the device 604. The member devices 608 are not within the initial display range area 620, but are within the modified display range area 622, thereby only triggering an event if display range is extended modified range area 628. As illustrated, the group of member devices 610 are within the initial range area 624, but not within the initial display range area 620 or the modified display range area 622. Therefore, the group of member devices 610 do not trigger any events.

Figure 7:
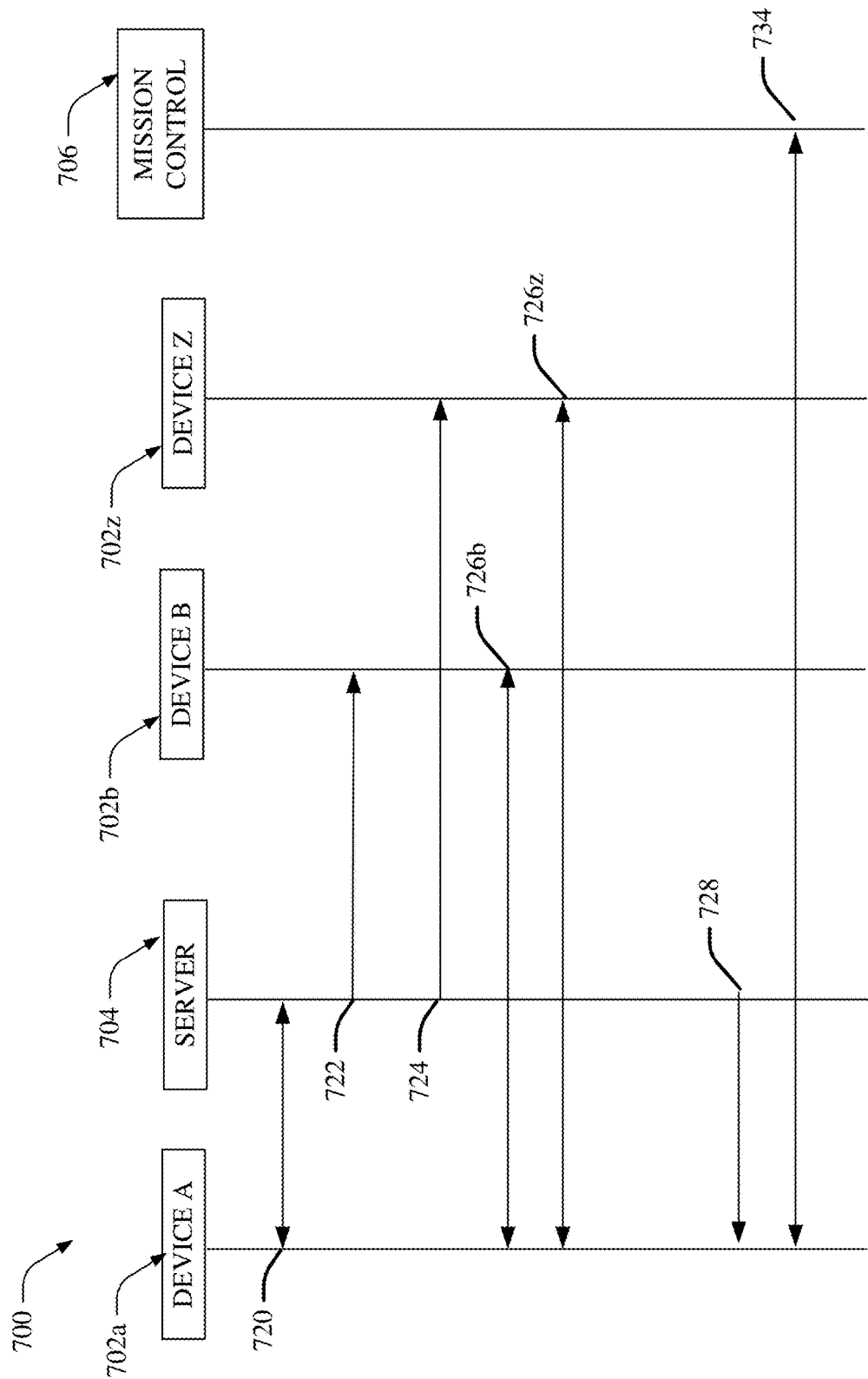
FIG. 7 illustrates an interaction flow between the devices that facilitate real time annotation and tracking of multiple devices operating in a network using augmented reality in accordance with one or more embodiments described herein.

FIG. 7 illustrates an interaction flow 700 between the devices that facilitate real time annotation and tracking of multiple devices operating in a network using augmented reality in accordance with one or more embodiments described herein. Upon activation of the system at the device A 702*a*, the device A can establish a communication link with service 704 and automatically initiate transition of various device information to a server 704 (e.g., automatically collect the device information and upload it) at 720. For example, the various device information comprises, but not limited to, location of the device (e.g., longitude and latitude), vital signs (e.g., heart beat rate, oxygen levels, etc.) of the user using the device, environment information surrounding the device (e.g., temperature, signal strength, number of devices within a pre-defined area (e.g., 3 feet), air quality, etc.), any landmarks near the device, and the like. If the device is communicatively connected to other devices, for example, oxygen tank, auto mobile, medical device, etc., status information can also be uploaded to the server 704. In some embodiments, server 704 can notify other member of the sub network 530 (e.g., devices 702*b* through 702*z*) using a broadcast message that device A 702*a* has joined the sub network 530. Once the device A 702*a* has joined the sub network comprising devices 702*b* through 702*z*, all the devices can begin communicating with each other using communication links 726*b* through 726*z*. In addition, upon scanning for at least one device (e.g., at least one device from connected devices 702*b* through 702*z*) of part of the sub network 530 entering the initial display range area 620, the server 704 downloads display information using communication link 728. In an embodiment, a mission controller 706 connected to the sub network 530 may collect the display information and download it upon at least one device (e.g., at least one device from connected devices 702*b* through 702*z*) of part of the sub network 530 entering the initial display range area 620 using link 734. In some embodiments, the device 702*a* may request the server 704 and/or mission control 706 to download all or portion of the display information. Upon receiving all or portion of the display information, the device 702*a* can display the display information, as illustrated in FIG. 4, within the display area 306 and add augmented reality display (e.g., arrow 408 over the devices within the display area and/or cast a directional arrow 412 from center of display area to the location of the devices).

Figure 8:
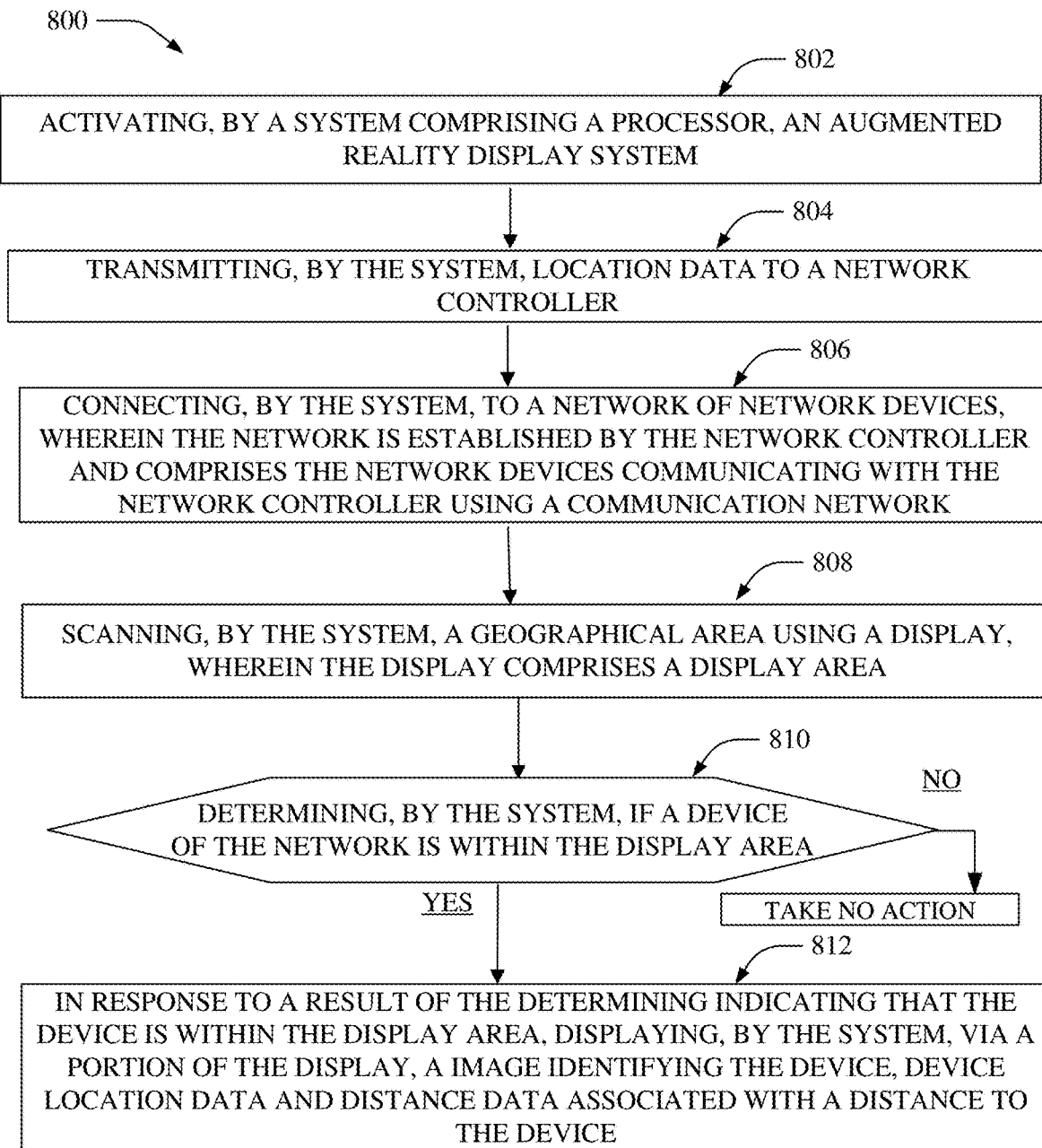
FIG. 8 depicts a diagram of an example, non-limiting computer implemented method that facilitates real time annotation and tracking of multiple devices operating in a network using augmented reality in accordance with one or more embodiments described herein.

FIG. 8 depicts a diagram of an example, non-limiting computer implemented method that facilitates real time annotation and tracking of multiple devices operating in a network using augmented reality in accordance with one or more embodiments described herein. In some examples, flow diagram 800 can be implemented by operating environment 1200 described below. It can be appreciated that the operations of flow diagram 800 can be implemented in a different order than is depicted.

In non-limiting example embodiments, a computing device (or system) (e.g., computer 1204) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts activating, by a system comprising a processor, an augmented reality display system. Operation 804 depicts transmitting, by the system, location data to a network controller. Operation 806 depicts connecting, by the system, to a network of network devices, wherein the network is established by the network controller and comprises the network devices communicating with the network controller using a communication network. Operation 808 depicts scanning, by the system, a geographical area using a display, wherein the display comprises a display area. Operation 810 depicts determining if a device of a network is within the display area (e.g., based on location of other members of user's team, e.g., other devices of the same network, and direction the user is looking at, are any members of the user's team within the display are, e.g., the user's mask.). If at least one device of a network or devices (e.g., team members) is within the display area, them perform operation 812. Otherwise, continue monitoring. Operation 812 depicts in response to a result of the determining indicating that the device is within the display area, displaying, by the system, via a portion of the display, a image identifying the device, device location data and distance data associated with a distance to the device.

Figure 9:
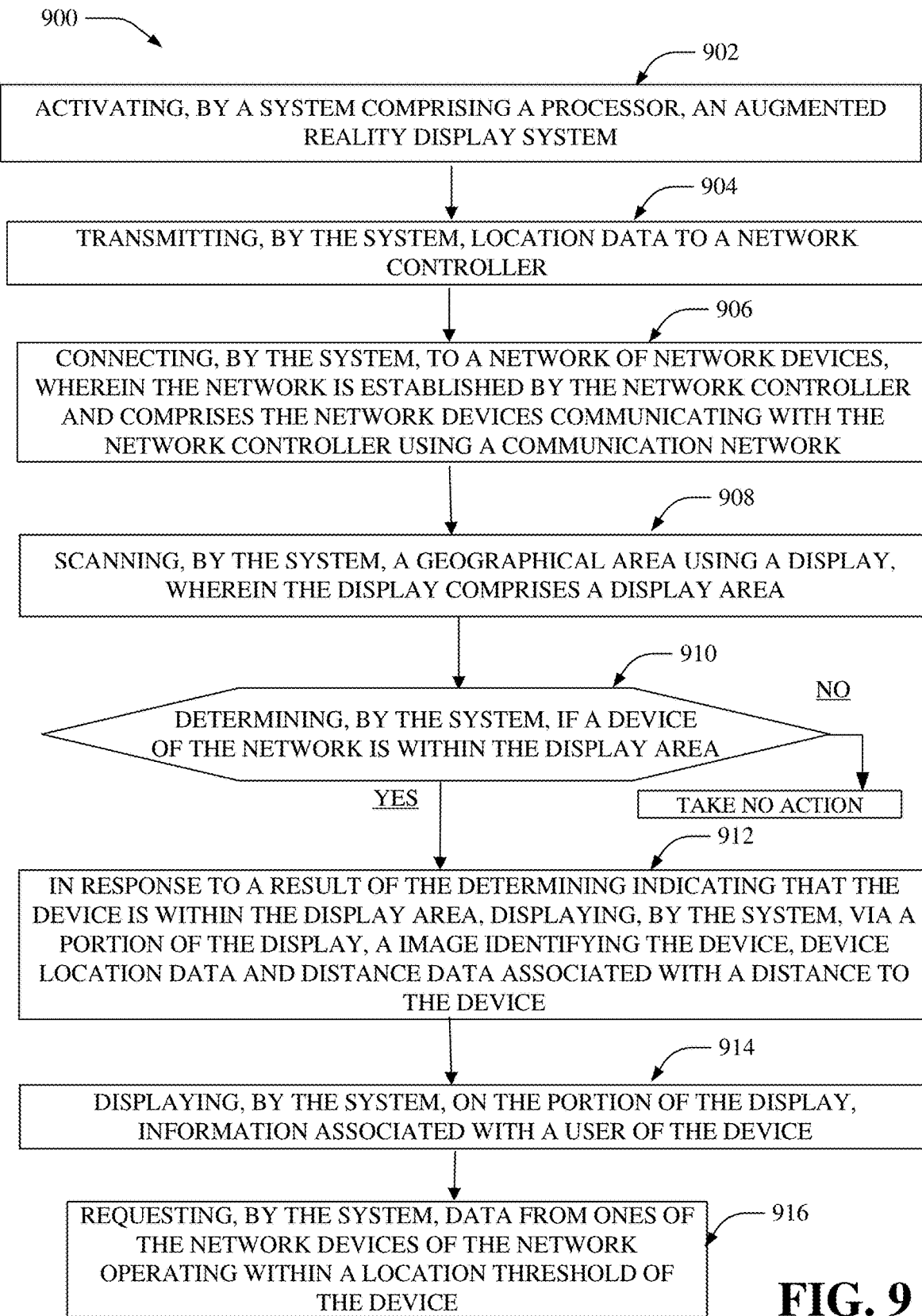
FIG. 9 depicts a diagram of an example, non-limiting computer implemented method that facilitates real time annotation and tracking of multiple devices operating in a network using augmented reality in accordance with one or more embodiments described herein.

FIG. 9 depicts a diagram of an example, non-limiting computer implemented method that facilitates real time annotation and tracking of multiple devices operating in a network using augmented reality in accordance with one or more embodiments described herein. In some examples, flow diagram 900 can be implemented by operating environment 1200 described below. It can be appreciated that the operations of flow diagram 900 can be implemented in a different order than is depicted.

In non-limiting example embodiments, a computing device (or system) (e.g., computer 1204) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts activating, by a system comprising a processor, an augmented reality display system. Operation 904 depicts transmitting, by the system, location data to a network controller. Operation 906 depicts connecting, by the system, to a network of network devices, wherein the network is established by the network controller and comprises the network devices communicating with the network controller using a communication network. Operation 908 depicts scanning, by the system, a geographical area using a display, wherein the display comprises a display area. Operation 910 depicts determining if a device of a network is within the display area (e.g., based on location of other members of user's team, e.g., other devices of the same network, and direction the user is looking at, are any members of the user's team within the display are, e.g., the user's mask.). If at least one device of a network or devices (e.g., team members) is within the display area, them perform operation 912. Otherwise, continue monitoring. Operation 912 depicts in response to a result of the determining indicating that the device is within the display area, displaying, by the system, via a portion of the display, a image identifying the device, device location data and distance data associated with a distance to the device. Operation 914 depicts displaying, by the system, on the portion of the display, information associated with a user of the device. Operation 916 depicts requesting, by the system, data from ones of the network devices of the network operating within a location threshold of the device.

Figure 10:
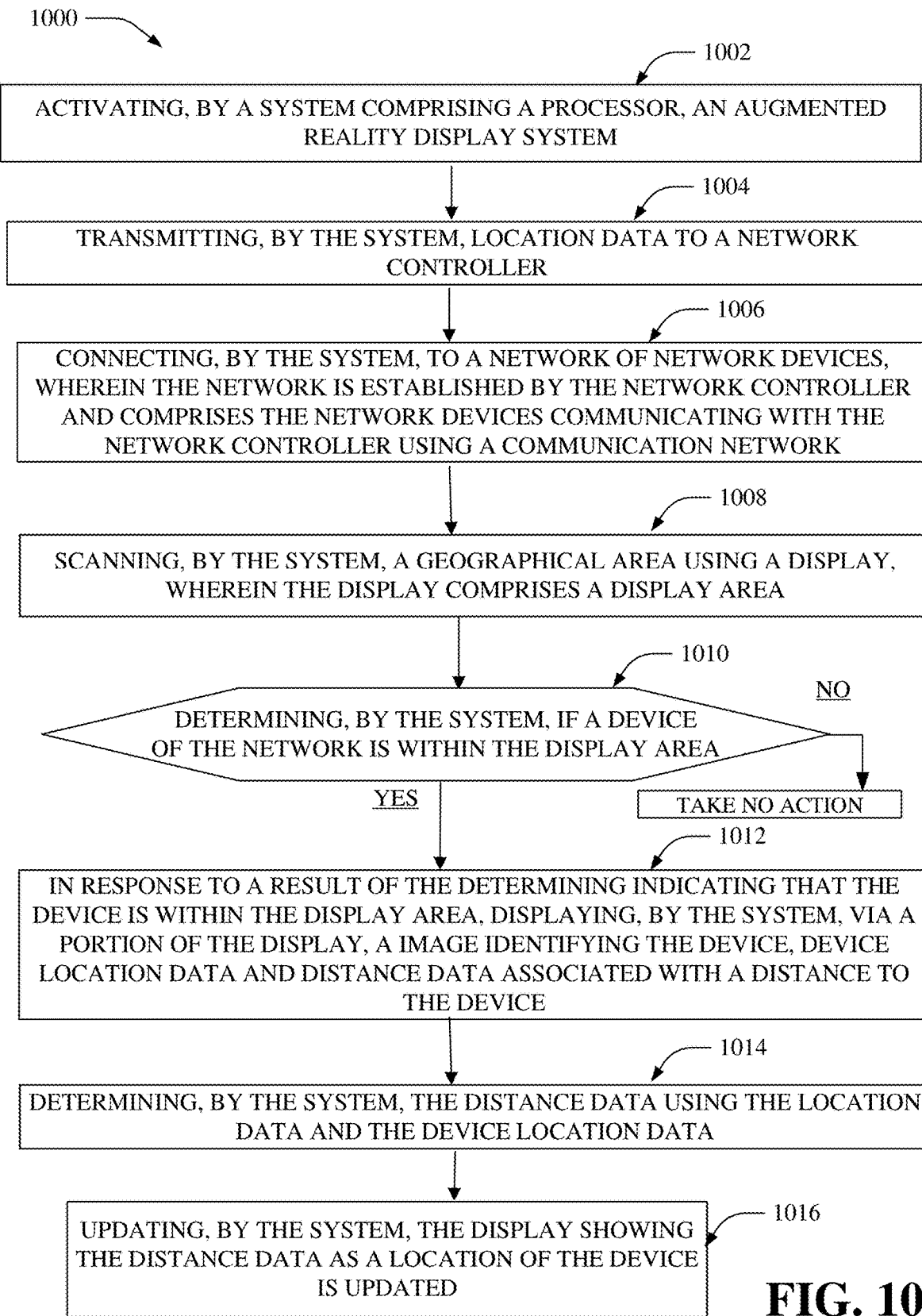
FIG. 10 depicts a diagram of an example, non-limiting computer implemented method that facilitates real time annotation and tracking of multiple devices operating in a network using augmented reality in accordance with one or more embodiments described herein.

FIG. 10 depicts a diagram of an example, non-limiting computer implemented method that facilitates real time annotation and tracking of multiple devices operating in a network using augmented reality in accordance with one or more embodiments described herein. In some examples, flow diagram 1000 can be implemented by operating environment 1200 described below. It can be appreciated that the operations of flow diagram 1000 can be implemented in a different order than is depicted.

In non-limiting example embodiments, a computing device (or system) (e.g., computer 1204) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 depicts activating, by a system comprising a processor, an augmented reality display system. Operation 1004 depicts transmitting, by the system, location data to a network controller. Operation 1006 depicts connecting, by the system, to a network of network devices, wherein the network is established by the network controller and comprises the network devices communicating with the network controller using a communication network. Operation 1008 depicts scanning, by the system, a geographical area using a display, wherein the display comprises a display area. Operation 1010 depicts determining if a device of a network is within the display area (e.g., based on location of other members of user's team, e.g., other devices of the same network, and direction the user is looking at, are any members of the user's team within the display are, e.g., the user's mask.). If at least one device of a network or devices (e.g., team members) is within the display area, them perform operation 1012. Otherwise, continue monitoring. Operation 1012 depicts in response to a result of the determining indicating that the device is within the display area, displaying, by the system, via a portion of the display, a image identifying the device, device location data and distance data associated with a distance to the device. Operation 1014 depicts determining, by the system, the distance data using the location data and the device location data. Operation 1016 depicts updating, by the system, the display showing the distance data as a location of the device is updated.

Figure 11:
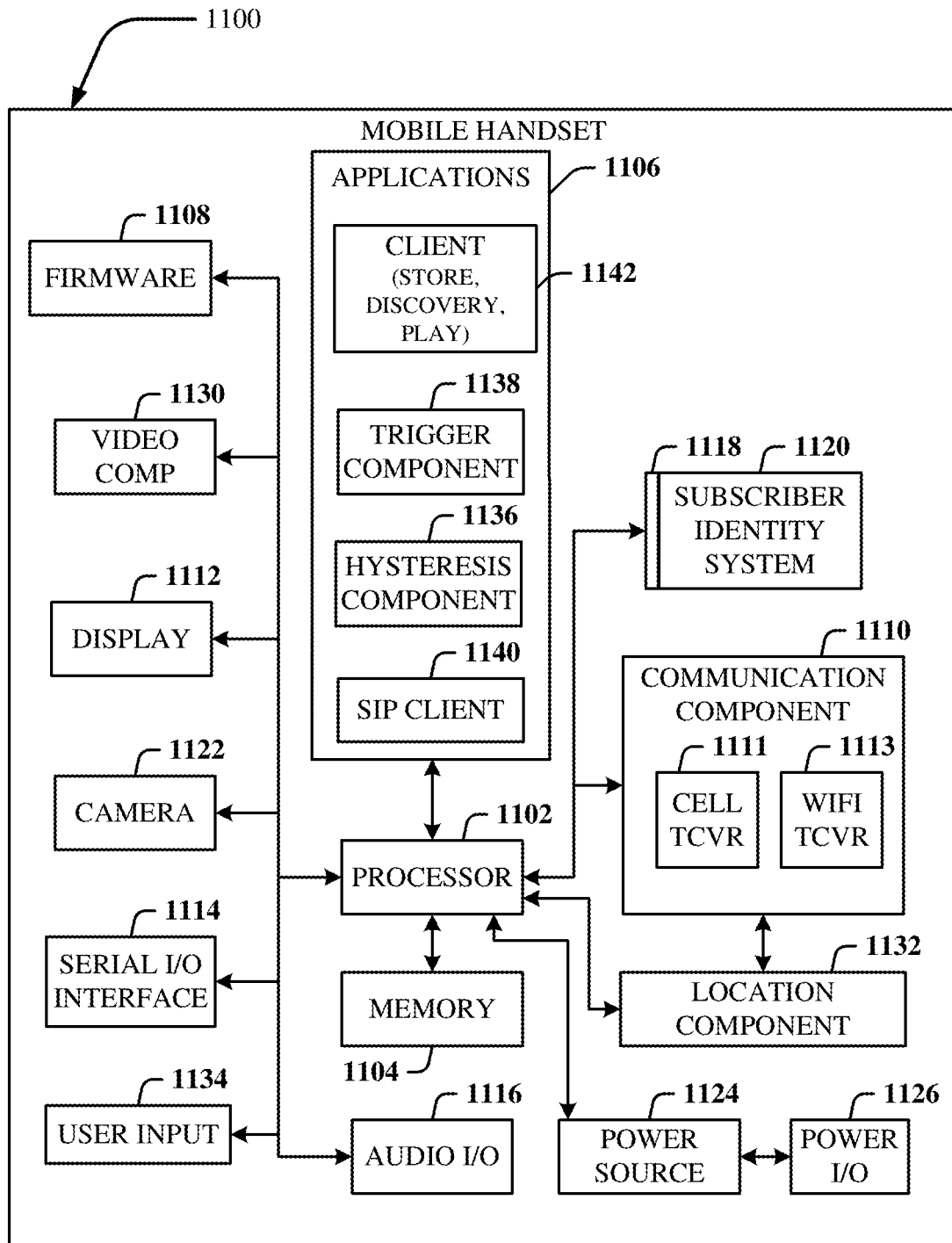
FIG. 11 illustrates an example block diagram of an example mobile handset operable to engage in a system architecture that facilitates wireless communications according to one or more embodiments described herein.

Referring now to FIG. 11, illustrated is an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108 and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1194) through a hardwire connection, and other serial input devices (e.g., a keyboard, keypad, and mouse). This can support updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touchscreen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE-802.11, for the dual-mode GSM handset 1100. The handset 1100 can accommodate at least satellite radio services through a handset that can combine wireless voice and digital radio chipsets into a single handheld device.

Figure 12:
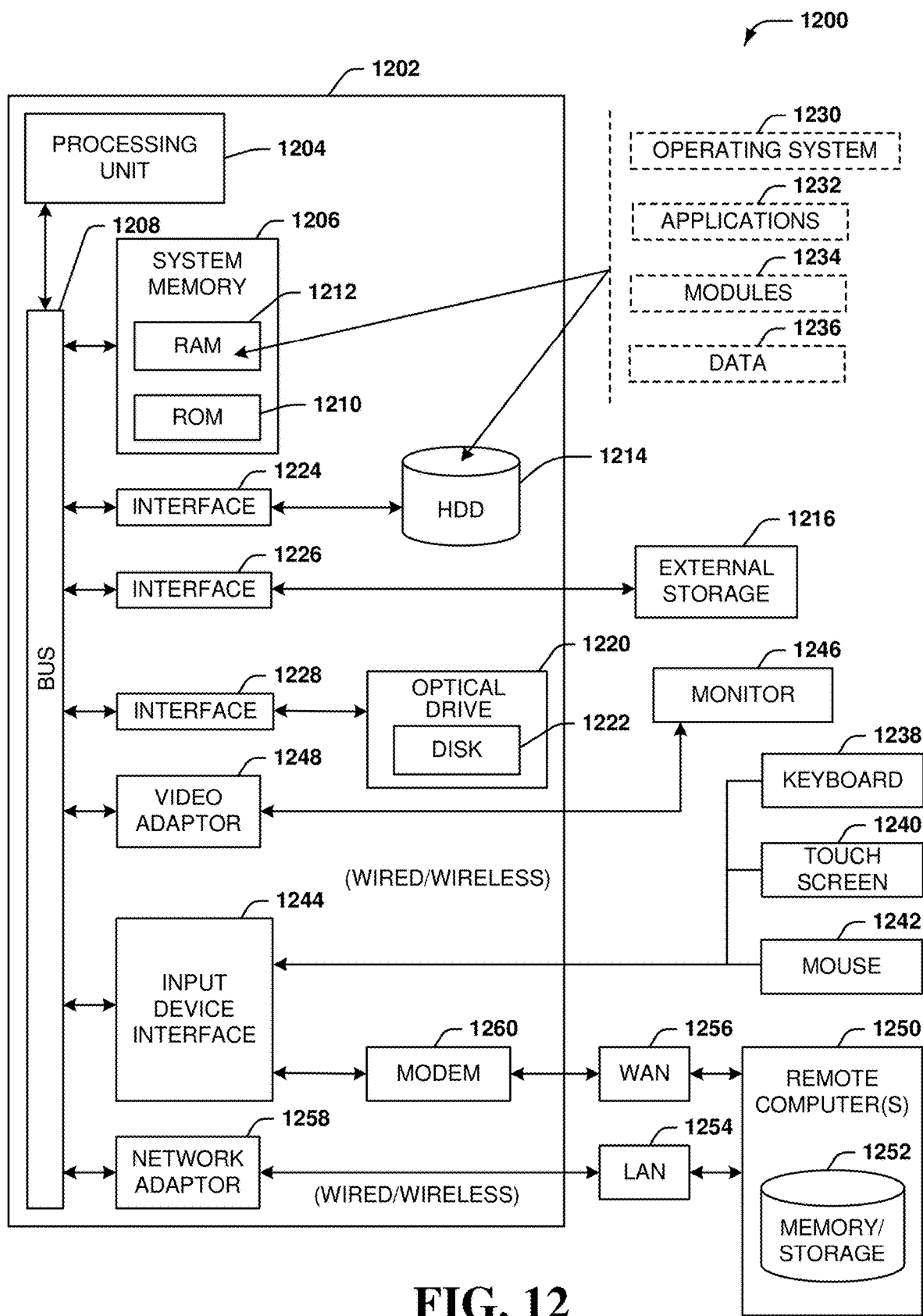
FIG. 12 illustrates an example block diagram of an example computer operable to engage in a system architecture that facilitates secure wireless communication according to one or more embodiments described herein.

Referring now to FIG. 12, illustrated is an example block diagram of an example computer 1200 operable to engage in a system architecture that facilitates wireless communications according to one or more embodiments described herein. The computer 1200 can provide networking and communication capabilities between a wired or wireless communication network and a server and/or communication device.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the description is not to be limited to any single implementation, but rather is to be construed in breadth, spirit and scope in accordance with the appended claims.

What is claimed is:

1. A device, comprising:
a processor; and
a memory that stores executable instructions that, when executed by the processor, facilitate performance of operations, comprising:
transmitting, via a first base station, location information to a network controller of a communication network comprising the first base station and a second base station;
joining a sub-network of member devices established by the network controller, wherein the device and the member devices of the sub-network communicate using a sub-network communication link enabled by the second base station,
wherein the first base station, via which the location information is transmitted to the network controller, is different than the second base station that enabled the sub-network communication link;
receiving, via the sub-network communication link enabled by the second base station, information associated with a member device of the member devices of the sub-network; and
displaying the information associated with the member device in response to an event, wherein the event comprises the member device being within a display range of the device.

2. The device of claim 1, wherein the operations further comprise initializing an initial range area comprising the display range.

3. The device of claim 2, wherein the operations further comprise modifying the initial range area.

4. The device of claim 3, wherein the operations further comprise, in response to modifying the initial range area, modifying the display range of the device, resulting in a modified display range, and displaying information associated with an additional member device of the member devices of the sub-network, wherein the additional member device of the member devices of the sub-network is within the modified display range of the device.

5. The device of claim 1, wherein the information associated with the member device comprises an image associated with the member device.

6. The device of claim 1, wherein the information associated with the member device comprises distance information associated with a distance to the member device.

7. The device of claim 1, wherein the information associated with the member device comprises member device location information associated with the member device, and wherein the operations further comprise determining, based on the member device location information, a distance to the member device.

8. The device of claim 1, wherein the information associated with the member device comprises user information associated with a user of the member device.

9. The device of claim 1, wherein the location information comprises latitude information and longitude information.

10. A method, comprising:
transmitting, by a device comprising a processor, via a first base station, location data to a network controller of a communication network comprising the first base station and a second base station;
connecting, by the device, to a sub-network of member devices, wherein the sub-network is defined and established by the network controller at the first base station, and wherein the member devices of the sub-network communicate using a sub-network communication link enabled by the second base station,
wherein the first base station comprising the network controller is different than the second base station that enabled the sub-network communication link;
receiving, by the device, via the sub-network communication link enabled by the second base station, information associated with a member device of the member devices of the sub-network; and
displaying, by the device, the information associated with the member device in response to an event, wherein the event comprises the member device being within a display range of the device.

11. The method of claim 10, wherein the location data comprises data representing a location of the device.

12. The method of claim 10, further comprising initializing, by the device, an initial range area comprising the display range, and subsequently modifying the initial range area and the display range.

13. The method of claim 10, further comprising determining, by the device, whether the member device is within the display area.

14. The method of claim 10, further comprising scanning, by the device, a geographical area comprising the display area.

15. The method of claim 10, further comprising activating, by the device, an augmented reality display system.

16. The method of claim 10, further comprising requesting, by the device, data from ones of the member devices of the sub-network operating within a location threshold of the device.

17. A non-transitory machine-readable medium, comprising executable instructions that, when executed by a processor, facilitate performance of operations, comprising:
determining a device location;
transmitting, via a communication link established by a network controller and a first base station, the device location and a request to join a sub-network established by the network controller, wherein the sub-network comprises member devices communicating using a sub-network communication link enabled by a second base station,
wherein the first base station comprising the network controller is different than the second base station used to enable the sub-network communication link;
receiving via the sub-network communication link enabled by the second base station, location information associated with a member device of the member devices communicating using the sub-network communication link; and
determining, based on the device location and the location information associated with the member device, a distance to the member device;
determining that the member device is within a display area; and
displaying the distance to the member device in response to determining that the member device is within the display area.

18. The non-transitory machine-readable medium of claim 17, wherein the operations further comprise receiving, via the sub-network communication link enabled by the second base station, display information associated with the member device, and displaying the display information in response to determining that the member device is within the display area.

19. The non-transitory machine-readable medium of claim 18, wherein the display information comprises an image and user information associated with a user of the member device.

20. The non-transitory machine-readable medium of claim 17, wherein the operations further comprise initializing an initial range area comprising the display range, and subsequently modifying the initial range area and the display range.

\* \* \* \* \*